Patented Oct. 6, 1942

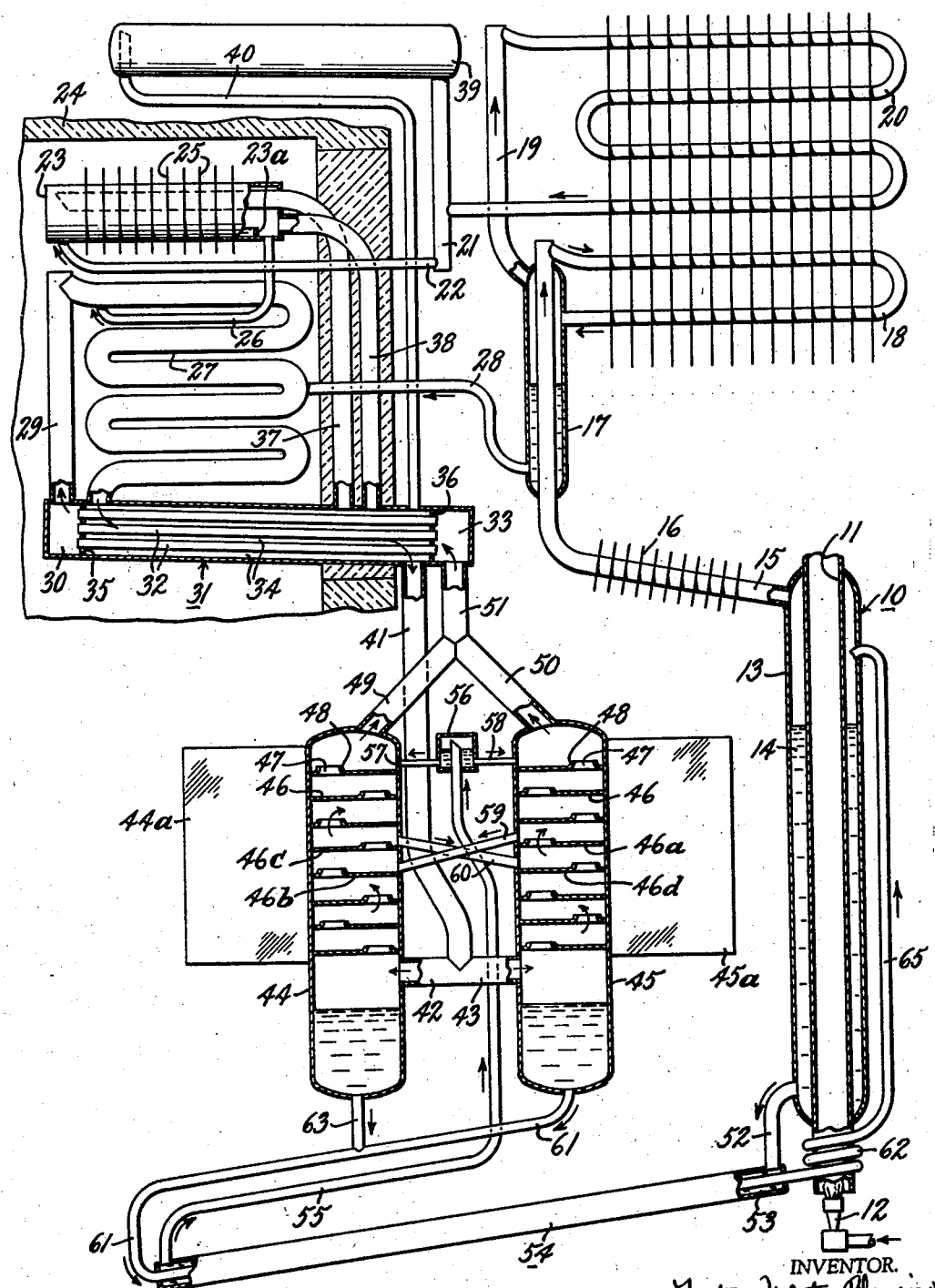

2,298,029

UNITED STATES PATENT OFFICE 2,298,029

REFRIGERATION

Gustav Mårten Blomqvist, Stockholm, Sweden, assignor, by mesne assignments, to Servel, Inc., New York, N. Y., a corporation of Delaware Application March 7, 1940, Serial No. 322,682

5 Claims. (Cl. 62—119.5)

My invention relates to refrigeration, and it is an object of the invention to provide an improved multiple absorber arrangement for use in absorption refrigeration systems.

In United States Letters Patent No. 1,908,901 to D. B. Knight and No. 2,066,660 to A. R. Thomas are shown absorption refrigeration systems with multiple absorbers and provision for dividing flow of absorption liquid among the absorbers for the reasons explained in those patents. In accordance with the present invention there are provided cross connections between the absorbers in such an arrangement made in a manner to provide for flow of substantially equal quantities of absorption liquid throughout the absorbers even though the division of liquid for flow to the several absorbers may become unequal, as set forth in the following description in connection with the accompanying drawing forming a part of this specification and of which the single figure shows more or less diagrammatically a refrigeration system provided with a multiple absorber arrangement embodying the invention.

The refrigerator system includes a generator 10 having a flue 11 which is heated in any suitable manner, as by a gas burner 12, for example. A jacket 13 disposed about flue 11 provides an annular space 14. A conduit 15 is connected to the upper part of space 14 and is provided with heat radiating fins 16 to form an air cooled rectifier. The conduit 15 extends upwardly through a jacket 17 and the upper end thereof is connected to one end of a condenser 18. The opposite or lower end of condenser 18 is connected to jacket 17. A conduit 19 extends upwardly from the upper end of jacket 17 and is connected to the upper end of a condenser 20.

The lower end of condenser 20 is connected by a vertical conduit 21 and a horizontal conduit 22 to one end of cooling element or evaporator 23 disposed within a thermally insulated space of a refrigerator cabinet 24. The evaporator 23 is provided with heat transfer fins 25, and dam 23a is located in the lower part thereof adjacent to the end opposite to that to which conduit 21 is connected.

A conduit 26 is connected to the lower part of evaporator 23 beyond the dam 23a and to a cooling element or evaporator 27 which is shown in the form of a pipe coil. A conduit 28 connects the bottom of jacket 17 with an intermediate point of evaporator 27.

A conduit 29 connects the upper end of evaporator 27 and a space 30 formed at one end of a gas heat exchanger 31. A plurality of tubes 32 connects the space 30 with a similar space 33 formed at the other end of gas heat exchanger 31. The tubes 32 extend through a central space 34 which is separated from the end spaces 30 and 33 by headers 35 and 36. The lower end of evaporator 27 is connected to space 34.

A conduit 37 connects space 34 and the upper part of evaporator 23, and a conduit 38 connects the lower part of evaporator 23 with space 34.

One end of a pressure vessel 39 is connected to the upper end of conduit 21, and a conduit 40 connects the opposite end thereof and space 34.

A conduit 41 extends downwardly from space 34 to branch conduits 42 and 43 which are connected to the lower parts of a plurality of absorbers 44 and 45, having cooling fins 44a and 45a, respectively. Each absorber is provided with a plurality of vertically spaced liquid retaining trays 46. Each tray is formed with one or more apertures 47 surrounded by raised rims 48. Conduits 49 and 50 connect the upper parts of absorbers 44 and 45 to a conduit 51 which in turn is connected to the space 33 of the gas heat exchanger 31.

A conduit 52 is connected to the lower part of space 14 in the generator 10 and one end of an outer jacket 53 of a liquid heat exchanger 54. A conduit 55 is connected to the other end of the jacket 53 and terminates within the upper part of a liquid distributing vessel 56. To the lower part of vessel 56 are connected conduits 57 and 58 which extend into the spaces above the uppermost trays 46 in the absorbers 44 and 45. The inner diameters of conduits 57 and 58 are so chosen that these conduits are filled with liquid during operation of the refrigeration system, thereby tending to equalize the distribution of liquid to the two absorbers 44 and 45 even though the system may be so positioned that the conduits 57 and 58 are not perfectly horizontal.

A conduit 59 is connected to absorber 45 at a point just above the upper surface of an intermediate tray 46a. The conduit 59 extends downwardly and the lower end thereof is connected to absorber 44 at a point just above an intermediate tray 46b therein. The upper end of a similar conduit 60 is connected to absorber 44 at a point just above another intermediate tray 46c and the lower end thereof is connected to absorber 45 at a point just above an intermediate tray 46d.

One end of a conduit 61 is connected to the bottom of absorber 45 and extends through the jacket 53 of the liquid heat exchanger 54, and the opposite end thereof is connected to the lower end of a coil 62 disposed around the lower end of flue 11 which extends below the jacket 13. A conduit 63 connects the lower end of absorber 44 and the conduit 61. A conduit 65 connects the upper end of coil 62 and the upper part of space 14 in the generator.

The operation of the refrigeration system just described is as follows:

The system is evacuated and charged with a solution refrigerant in absorption liquid, such as ammonia in water, for example, and also an auxiliary agent or inert gas, such as hydrogen. The heating of generator 10 by the burner 12 causes ammonia to be expelled from solution in space 14, and the expelled ammonia vapor flows through the conduit 15 and air cooled rectifier 16 to the condenser 18.

The ammonia vapor is liquefied in condenser 18 and flows therefrom to the jacket 17 which serves as a liquid cooled rectifier for ammonia vapor flowing to the condenser 18. Ammonia vapor not liquefied in condenser 18 flows through jacket 17 and the conduit 19 to the condenser 20 in which it is liquefied.

When sufficient liquid accumulates in jacket 17, liquid flows therefrom through conduit 28 into evaporator 27. Liquid ammonia in evaporator 27 evaporates and diffuses into the hydrogen gas which enters through the conduit 29, thereby producing a refrigerating effect. The rich gas mixture of amonia and hydrogen formed in evaporator 27 flows into the central or outer passage 34 of gas heat exchanger 31.

Liquid formed in condenser 20 and flowing through conduits 21 and 22 into evaporator 23 evaporates and diffuses into rich gas which circulates therethrough, thereby producing a refrigerating effect and precooling liquid flowing through conduit 26 to evaporator 27.

Since rich gas flows through evaporator 23 through conduits 37 and 38 while gas weak in refrigerant enters evaporator 27 through conduit 29, the gas in evaporator 23 contains a greater amount of ammonia vapor than the gas in evaporator 27, and hence evaporation of liquid takes place at a higher temperature in evaporator 23 than in evaporator 27.

The evaporator 23 may be primarily employed for cooling the thermally insulated space of refrigerant cabinet 24 and is formed with the heat transfer fins 25 to provide a relatively extensive heat transfer surface. The evaporator 23 is preferably provided with a limited heat transfer surface and may be employed as a freezing unit since evaporation of liquid takes place at a lower temperature therein.

The rich gas mixture formed in evaporator 23 flows therefrom through conduit 38 into the central or outer passage 34 of gas heat exchanger 31. From the space or outer passage 34 of gas heat exchanger 31 the rich gas mixture from the evaporators 23 and 27 flows through the conduit 41 and the branch conduits 42 and 43 to the lower parts of the absorbers 44 and 45. The gas mixture flows upwardly through each absorber 44 and 45, such upward path of flow for the gas mixture being provided by the apertures 47 in the liquid reaining trays 46. Absorption liquid weak in refrigerant flows downwardly in the absorbers 44 and 45 and absorbs ammonia vapor from the hydrogen gas, and hydrogen gas weak in ammonia vapor flows from the absorbers through conduits 49 and 50, conduit 51, the plurality of tubes 32 forming the inner passage of gas heat exchanger 31, and conduit 29 into the upper part of evaporator 27. The circulation of inert gas or hydrogen just described is due to the difference in specific weight of the columns of hydrogen rich and weak, respectively, in ammonia vapor, whereby a force is produced or developed within the system to cause circulation of gas in the gas circuit.

Absorption liquid enriched in ammonia flows from the lower parts of absorbers 44 and 45, the absorption liquid flowing from the absorber 44 through conduit 63 mixing with absorption liquid flowing from absorber 45 through conduit 61. After passing through the liquid heat exchanger 54, the enriched absorption liquid enters the coil 62 in which liquid is raised by vapor-liquid lift action through tube 65 into the upper part of generator 10. Ammonia vapor expelled out of solution in the space 14, together with vapor entering through tube 65, flows upwardly through conduit 15 into condenser 20, as explained above.

Absorption liquid from which refrigerant has been expelled flows from generator 10 through conduit 52, jacket 53 of liquid heat exchanger 54, and conduit 55 into the distributing vessel 56. This circulation of absorption liquid is effected by raising of liquid in tube 65 by vapor-liquid lift action. From vessel 56 liquid flows by gravity and is distributed through the conduits 57 and 58 to the upper ends of the absorbers 44 and 45. Since great difficulty is encountered in effecting the desired distribution of liquid in a plurality of absorbers, provision is made to obtain a desired circulation of the absorption liquid. In this embodiment the liquid introduced through conduit 57 into the upper part of absorber 44 flows downwardly by gravity over the trays 46 until the liquid reaches the intermediate tray 46c. Instead of forming a pool on this tray of sufficient depth to overflow the rim 48a, the liquid flows through the conduit 60 to the tray 46d in absorber 45. In a similar manner, the liquid entering the upper part of absorber 45 through conduit 58 flows downwardly by gravity over the trays 46 to the intermediate tray 46a. From tray 46a liquid flows through conduit 59 to the tray 46b in absorber 44. After liquid is diverted from one to the other of the absorbers through the conduits 59 and 60, the absorption liquid continues to flow downwardly through the absorber to which it is diverted.

Since the absorbers 44 and 45 are substantially the same in size, it is desirable to effect an equal distribution of rich gas flowing therethrough from the branch conduits 42 and 43; and it is also desirable to effect an equal distribution of weak absorption liquid flowing to the upper parts of the absorbers through the conduits 57 and 58. In the event that more liquid flows into the upper part of absorber 45 through conduit 58 than to the upper part of absorber 44 through conduit 57, then a greater quantity of liquid will flow over the trays 46 in the upper part of absorber 45 than over the trays 46 in the upper part of absorber 44. By providing the cross-over or cross-flow connection conduits 59 and 60, however, the greater quantity of liquid flowing through the upper part of absorber 45 is diverted through the conduit 59 and such greater quantity of liquid will flow over the trays 46 in the lower part of absorber 44. Likewise, the smaller quantity of liquid flowing in the upper part of absorber 44 is diverted through conduit 60 and such smaller quantity will flow through the lower part of absorber 45. With the absorption liquid circulation provided, therefore, the total amount of liquid flowing through one absorber is substantially the same as that flowing through the other, even though unequal quantities of liquid may be initially supplied to the absorbers.

What is claimed is:

1. In refrigeration apparatus of an absorption type having a generator, an evaporator, a plurality of absorbers, and members forming a circuit for gas from said evaporator through said absorbers in parallel, members forming a circuit for absorption liquid from said generator through said absorbers in parallel and including a liquid divider to distribute liquid flowing to said absorbers, and one or more cross connections between said absorbers for diverting liquid from one to another of said absorbers.

2. In absorption refrigeration apparatus having circuits for circulation of a refrigerant, an absorption liquid and an inert gas, a plurality of absorbers each having a plurality of vertically spaced liquid retaining trays, connections for introducing liquid onto the upper trays in each of said absorbers, and cross-over connections for conducting liquid from each of said absorbers to another of said absorbers below said upper trays, whereby substantially equal quantities of liquid flow through each of said absorbers even though unequal quantities of liquid may be initially supplied to said upper trays.

3. In an absorption refrigeration system containing refrigerant fluid and absorption liquid, a plurality of absorbers disposed in side-by-side relation and substantially at the same elevation, connections for flowing refrigerant fluid to said absorbers in parallel, connections for flowing absorpton liquid to said absorbers in parallel, and conduits interconnecting said absorbers for directing flow of absorbtion liquid through parts of different ones of said absorbers in series.

4. In an absorption refrigeration system having a plurality of absorbers, means for conducting refrigerant fluid through said absorbers in parallel, means for conducting absorption liquid to and from each of said absorbers individually, and means for causing exchange of absorption liquid between said absorbers at places in said absorbers in the path of flow of liquid therethrough.

5. In an absorption refrigeration system, an evaporator, a plurality of absorbers, means for supplying refrigerant fluid to said evaporator, means for conducting auxiliary fluid in a circuit through said evaporator and through said absorbers, the fluid flowing through said absorbers in parallel streams, means for flowing a stream of absorption liquid to each of said absorbers, means for withdrawing absorption liquid from each of said absorbers, and means for exchanging liquid between said absorbers at substantially corresponding points in the path of flow of liquid therethrough.

GUSTAV MARTEN BLOMQVIST.